(12) United States Patent  
Beleski, Jr.

(10) Patent No.: US 6,220,612 B1  
(45) Date of Patent: Apr. 24, 2001

(54) CAMBERING VEHICLE AND MECHANISM

(76) Inventor: J. Gildo Beleski, Jr., Rua Joao Parolium 131, Prado Velho Cep 80220-290 Curitiba Pr (BR)

( * ) Notice: Subject to any disclaimer, the term of this patent is extended or adjusted under 35 U.S.C. 154(b) by 0 days.

(21) Appl. No.: 09/434,371

(22) Filed: Nov. 5, 1999

(51) Int. Cl.$^7$ .................................................. B62M 1/00
(52) U.S. Cl. .............................. 280/87.041; 280/87.05; 280/40
(58) Field of Search ................... 280/87.041, 87.042, 280/87.05, 639, 40, 652, 655, 659, DIG. 6, 124.11, 124.111; 403/61, 59, 52, 53, 151

(56) References Cited

U.S. PATENT DOCUMENTS

| | | | |
|---|---|---|---|
| 1,303,127 | * 5/1919 | Wickman | 280/87.05 |
| 1,336,100 | * 4/1920 | Shearer | 280/87.04 |
| 1,664,858 | * 4/1928 | Headley | 280/87.041 |
| 1,890,755 | * 12/1932 | Shepherd | 280/87.03 |
| 2,598,046 | * 5/1952 | Frey | 280/38 |
| 4,045,048 | 8/1977 | Irwin . | |
| 4,047,732 | 9/1977 | Williams et al. . | |
| 4,050,711 | 9/1977 | Denzer . | |
| 4,050,712 | 9/1977 | Denzer et al. . | |
| 4,050,713 | 9/1977 | Williams . | |
| 4,054,300 | 10/1977 | Winchell . | |
| 4,065,146 | 12/1977 | Denzer . | |
| 4,071,261 | 1/1978 | Winchell . | |
| 4,076,270 | 2/1978 | Winchell . | |
| 4,087,104 | 5/1978 | Winchell et al. . | |
| 4,087,106 | 5/1978 | Winchell . | |
| 4,087,108 | 5/1978 | Winchell . | |
| 4,088,338 | 5/1978 | Winchell et al. . | |
| 4,123,079 | 10/1978 | Biskup . | |
| 4,133,551 | 1/1979 | Biskup . | |
| 4,165,093 | 8/1979 | Biskup . | |
| 4,540,192 | 9/1985 | Shelton . | |
| 5,039,121 | 8/1991 | Holter . | |
| 5,785,331 | 7/1998 | Rappaport . | |
| 5,836,601 | * 11/1998 | Nelson | 280/645 |
| 5,871,218 | * 2/1999 | Lepage et al. | 280/33.992 |
| 6,059,304 | * 5/2000 | Kakimi | 280/124.11 |
| 6,120,044 | * 9/2000 | Tsai | 280/87.05 |

FOREIGN PATENT DOCUMENTS

2413377    10/1975    (DE) .

* cited by examiner

*Primary Examiner*—J. J. Swann  
*Assistant Examiner*—Michael Cuff  
(74) *Attorney, Agent, or Firm*—Richard C. Litman (57) ABSTRACT

A cambering vehicle includes a single steerable front wheel and a pair of rear wheels at the rearward ends of trailing arms extending from the front structure. The two trailing arms are articulated to the front structure, and may move arcuately in a plane parallel to the front wheel column of the vehicle. The two trailing arms are linked together by a novel yoke mechanism, and move in opposite directions but in equal arcuate distances relative to one another. The vehicle operates using the principle of conservation of angular momentum, with the vehicle traveling a sinusoidal path and the operator leaning to the inside of the turn. This moves the center of gravity of the vehicle and operator to the inside of the turn, thus accelerating the vehicle and operator along the path of the turn to increase the velocity of the device. The yoke mechanism of the vehicle may be quickly and easily removed, thus allowing the vehicle to be folded for storage. The yoke mechanism also allows the vehicle to be provided with a simple, fixed stop mechanism for limiting the arcuate travel of the two trailing arms. The present vehicle is also equipped with brakes for the two rear wheels, with dual operator controls independently actuating each brake. While the present invention is primarily directed to a wheeled vehicle, the operating principle is applicable to use with skis, skates, and other sliding contact devices as well, with such sliding contact devices being adaptable to the present vehicle.

19 Claims, 5 Drawing Sheets

CAMBERING VEHICLE AND MECHANISM

BACKGROUND OF THE INVENTION

1. Field of the Invention

The present invention relates generally to small, three wheeled, operator propelled vehicles, and more specifically to the class of vehicle known as "cambering vehicles," in which forward motion is provided by the alternating shifting of weight from side to side as the vehicle travels a sinusoidal path, due to the conservation of angular momentum. The present cambered vehicle includes a novel yoke linkage between the two trailing arms for the rear wheels, which links the two trailing arms together for alternating motion. The easily removable yoke also provides for ease of folding of the vehicle for storage.

2. Description of the Related Art

A type of operator propelled three wheeled vehicle known as a "cambering vehicle" has a single steerable front wheel and a pair of laterally spaced rear wheels on trailing arms which are articulated to the front column from which the front wheel extends. As the vehicle travels a sinusoidal path, the operator shifts his or her weight to the inside of each turning arc, thus shifting the center of mass to the inside of each arc. This results in a series of accelerations due to the conservation of momentum of the vehicle and operator. In this manner, forward motion is attained.

The above principle of propulsion is well known, as described in at least one of the issued patents discussed further below. Such vehicles utilize various mechanisms (cables and pulleys, gears, bellcranks, etc.) to link the two trailing arms together, with such mechanisms being cited in the related art discussed further below. However, the present cambered vehicle differs from those of the prior art in that it utilizes a novel yoke mechanism to link the motion of the two trailing arms together, with the yoke also providing for ease of folding of the present vehicle by means of the removal of a single fitting.

A discussion of the related art of which the present inventor is aware, and its differences and distinctions from the present invention, is provided below.

U.S. Pat. No. 4,045,048 issued on Aug. 30, 1977 to Clarence C. Irwin, titled "Trailing Arm Cambering Vehicle With Stabilizer Linkage Having Locking Means For Parking And Stowage," describes a cambering vehicle in which the trailing arms are linked to a bellcrank which is pivotally attached to the front column well above the attachment point of the arms to the front column. The two arms are linked to the bellcrank by pushrods. A locking plate having an arcuate slot therein with a threaded locking pin extending therethrough, permits a threaded knob to be tightened to lock the mechanism in a stationary position for upright storage of the vehicle. The folding mechanism is relatively complex in comparison to the present vehicle, in that Irwin requires both of the bellcrank connecting links to be removed.

U.S. Pat. No. 4,047,732 issued on Sep. 13, 1977 to Jerry K. Williams et al., titled "Cambering Vehicle With Hydraulic Stabilizer And Equalizer," describes a vehicle similar to that of the Irwin '048 U.S. Patent discussed immediately above, but having interconnected hydraulic cylinders linking the two trailing arms, rather than a mechanical linkage. The system functions similarly to that of the Irwin '048 U.S. Patent, with the extension of one cylinder causing the retraction of the opposite cylinder. A valve is used to shut off the flow of hydraulic fluid between the two struts to lock the position of the vehicle as desired. The valve may also be adjusted to allow fluid to flow from one end to the other of the two cylinders, thereby allowing both cylinders to collapse simultaneously for folding the vehicle. The present vehicle avoids fluids and hydraulics, utilizing a yoke member for connecting the two trailing arms, and moreover does not require any form of intermediate links between the trailing arms and the yoke.

U.S. Pat. No. 4,050,711 issued on Sep. 27, 1977 to Richard E. Denzer, titled "Cambering Device For Cambering Vehicle," describes a trailing arm interconnect mechanism having two opposed arms disposed about a single pivot. The arms may be locked together to form a bellcrank to provide opposite action of the two trailing arms, or may be folded to allow the front column to be folded to the trailing arms for storage of the device. As in the other cambering vehicles discussed above, the Denzer vehicle links the trailing arms to the actuating mechanism by connecting rods, rather than using a direct yoke mechanism as in the present vehicle.

U.S. Pat. No. 4,050,712 issued on Sep. 27, 1977 to Richard E. Denzer et al., titled "Cambering Device For Cambering Vehicle," describes a mechanism very similar to that of the '711 U.S. Patent to the same first inventor, discussed immediately above. The device of the '712 Patent differs in that the central mechanism comprises a pair of meshed sector gears which may be locked together to provide the alternating action of the two trailing arms and their links to the mechanism. Unlocking the gears allows the forward structure to be folded adjacent to the two trailing arms. The device differs from the present cambering vehicle mechanism, with its single yoke configuration.

U.S. Pat. No. 4,050,713 issued on Sep. 27, 1977 to Jerry K. Williams, titled "Cambering Device For Cambering Vehicle," describes a mechanism similar to that of the '048 U.S. Patent to Irwin, discussed further above. The device of the '713 Patent comprises a pair of arcuate bellcranks which may be locked together to provide the opposite lifting and descending action of the two trailing arms, with the locking means allowing the two bellcranks to be arcuately folded together for folding the forward structure adjacent the trailing arms for storage.

U.S. Pat. No. 4,054,300 issued on Oct. 18, 1977 to Frank J. Winchell, titled "Cambering Vehicle With Trailing Arms Interconnected By Geared Stabilizer And Equalizer Mechanism," describes a mechanism comprising a pair of opposed sector bevel gears disposed upon each pivot shaft of the trailing arms, with a central spur gear linking the two sector gears to provide equal and opposite arcuate movement of the trailing arms. The mechanism includes locking means for parking the vehicle, and means for releasing the gears to allow for folding the front structure adjacent the trailing arms. No yoke mechanism is provided. The Winchell vehicle differs further in that it includes an engine driving the front wheel, which teaches away from the conservation of angular momentum principle of operation of unpowered cambering vehicles, including the present vehicle.

U.S. Pat. No. 4,065,146 issued on Dec. 27, 1977 to Richard E. Denzer, titled "Cambering Device For Cambering Vehicle," describes a mechanism similar to that described in the '713 U.S. Patent discussed further above. A pair of bellcranks works between opposite links to the two trailing arms, to cause the trailing arms to work opposite one another, as is known in the cambering vehicle art. The two bellcranks may be adjusted relative to one another to allow the vehicle to fold, in the manner generally described in the '713 U.S. Patent. As in the case of the '713 U.S. Patent and others known to the present inventor, no yoke means is disclosed.

U.S. Pat. No. 4,071,261 issued on Jan. 31, 1978 to Frank J. Winchell, titled "Lock Bar For Cambering Vehicle," describes a mechanism quite similar to that described in the '711 U.S. Patent discussed further above, but including a lock bar which may be installed between the two trailing arms to secure them together for parking the vehicle. Again, no yoke mechanism is provided for tying together the motion of the two trailing arms, as provided by the present cambering vehicle mechanism.

U.S. Pat. No. 4,076,270 issued on Feb. 28, 1978 to Frank J. Winchell, titled "Foldable Cambering Vehicle," describes a trailing arm interconnect mechanism comprising a continuous cable run, with an idler pulley serving to reverse the direction of travel of the cable about the opposite trailing arm pulleys. The Winchell '270 U.S. Patent also discloses a bellcrank trailing arm interconnect system similar to that described in the '711 U.S. Patent discussed further above, and further discloses an engine powered embodiment similar to that of the '300 U.S. Patent to the same inventor, discussed further above. Again, no yoke mechanism is provided for linking the two trailing arms, as provided in the present cambering vehicle invention.

U.S. Pat. No. 4,087,104 issued on May 2, 1978 to Frank J. Winchell et al., titled "Method Of Manually Propelling A Cambering Vehicle," describes a pulley system for interconnecting the two trailing arms, essentially the same as that described in the '270 U.S. Patent discussed immediately above. The '104 U.S. Patent also describes the principle of conservation of angular momentum for the operation of cambered vehicles, and includes a skate equipped embodiment.

U.S. Pat. No. 4,087,106 issued on May 2, 1978 to Frank J. Winchell, titled "Cambering Vehicle," describes various embodiments incorporating the cable actuation, motor power, and skate and ski equipped embodiments generally disclosed in the '270 and '104 U.S. Patents to the same inventor, and discussed above. Although a throttle control lever is provided, no brake means is disclosed.

U.S. Pat. No. 4,087,108 issued on May 2, 1978 to Frank J. Winchell, titled "Cambering Vehicle With Trailing Arms Interconnected By Spur Gearing," describes a mechanism in which the two pivot axles of the trailing arms are nonconcentric with one another, and are interconnected by mating gears. A motorized embodiment is also disclosed, similar to that of the '300, '270, and '106 U.S. Patents to the same inventor, discussed above. As in those patents and others with which the present inventor is familiar, no yoke mechanism for interconnecting the two trailing arms, is disclosed in the '108 U.S. Patent, and while a declutching lever is provided, no brake control lever is disclosed.

U.S. Pat. No. 4,088,338 issued on May 9, 1978 to Frank J. Winchell et al., titled "Cambering Vehicle With Cable Stabilizer And Equalizer," describes a vehicle utilizing a pulley system for linking the two trailing arms, similar to the mechanisms disclosed in the '270 and '104 U.S. Patents to the same first inventor, discussed further above. The same distinctions noted between those devices and the present invention are seen to apply here.

U.S. Pat. No. 4,123,079 issued on Oct. 31, 1978 to Edward J. Biskup, titled "Occupant Propelled Cambering Vehicle," describes one embodiment wherein the two trailing arms are resiliently interconnected by means of a torsion bar between the two trailing arm pivot axles, and another embodiment wherein the trailing arms are resilient. In both cases the resilient means allows the arms to move independently of one another, unlike the yoke interconnect and rigid trailing arms of the present invention.

U.S. Pat. No. 4,133,551 issued on Jan. 9, 1979 to Edward J. Biskup, titled "Cambering Device For Cambering Vehicle," describes a trailing arm interconnect mechanism comprising a crank arm having oppositely offset cranks which ride in slots in the opposite trailing arms. As one crank arm travels in one direction, the opposite crank arm travels in the opposite direction, thereby causing the two trailing arms to work opposite to one another. Again, no yoke mechanism is provided.

U.S. Pat. No. 4,165,093 issued on Aug. 21, 1979 to Edward J. Biskup, titled "Occupant Propelled Cambering Vehicle," describes resilient interconnect means for the two trailing arms, essentially the same as the interconnect means disclosed in the '079 U.S. Patent. The '093 Patent is a division of the '079 U.S. Patent discussed further above, and the same points raised in that discussion are seen to apply here as well.

U.S. Pat. No. 4,540,192 issued on Sep. 10, 1985 to L. H. Shelton, titled "Three-Wheeled Scooter-Type Vehicle," describes a different principle of operation for such tricycle type vehicles, in which the two rear wheels remain in the same plane, but caster inwardly and outwardly with the two trailing arms also moving laterally inwardly and outwardly relative to one another. The operation is similar to skating or cross country skiing, in which the skate or ski is angled relative to the path of travel, with lateral thrust developing a forward thrust vector to propel the skier, skater, or (in the present case) vehicle forward. This principle of operation does not apply to the present vehicle.

U.S. Pat. No. 5,039,121 issued on Aug. 13, 1991 to Donovan A. Holter, titled "Tri-Skater," describes a tricycle type vehicle in which the two trailing arms are immovably affixed to the front structure during operation. A single brake is provided on the front wheel, rather than independent brakes for the two rear wheels. The principle of operation is thus more closely related to the vehicle of the '192 U.S. Patent, discussed immediately above, than to the present vehicle invention.

U.S. Pat. No. 5,785,331 issued on Jul. 28, 1998 to Mark Rappaport, titled "Dual-Footboard Scooter," describes a tricycle type vehicle having a rigid frame, with the two rear wheels having fixed axles with no camber, caster, toe-in, or toe-out. The device is operated as a conventional scooter by pushing and coasting. A single brake is provided for the front wheel, whereas the present vehicle includes independent brakes for each rear wheel.

Finally, German Patent Publication No. 2,413,377 published on Oct. 2, 1975 illustrates a scooter and vertically undulating track, with the operator shifting his/her weight forwardly and rearwardly to shift the center of gravity of the vehicle over the crest of an undulation and thereby coast down the opposite side, the device of the German Patent Publication is constructed in the reverse of the present invention, with two forward wheels and one rearward wheel, and the frame is rigid, thus precluding any cambering action or operation by conservation of angular momentum.

None of the above inventions and patents, either singly or in combination, is seen to describe the instant invention as claimed.

SUMMARY OF THE INVENTION

The present invention comprises a cambering vehicle, wherein forward motion is achieved by lateral shift of the operator's weight to the inside of the turn as the vehicle travels a sinusoidal path. Due to the principle of conservation of angular momentum, the weight shift is partially translated to forward motion in the direction of travel. The above principle is well known, with numerous cambering vehicles utilizing various mechanisms to link the two trailing arms of the vehicle together to provide the desired action. However, the present vehicle utilizes a novel yoke mechanism for linking the two trailing arms together, with the present yoke mechanism providing an advance in simplicity, durability, and ease of folding for storage over the relatively complex linkages and mechanisms of the prior art.

The yoke mechanism of the present cambering vehicle provides several advantages in a single mechanism, by (1) linking the two trailing arms to articulate equally and oppositely to one another, (2) providing for folding of the vehicle for storage by the removal of a single fastener, and (3) enabling the vehicle to be provided with a simple, fixed stop means to limit the travel of the two trailing arms. The present cambering vehicle also has a separate brake for each rear wheel, with each brake being independently actuated by separate levers by the vehicle operator. While the present cambering vehicle is primarily supported by wheels, it will be seen that the principle of operation need not be limited to rollers or wheels, but may be applied to skis, skates, etc. as well.

Accordingly, it is a principal object of the invention to provide an improved cambering vehicle incorporating a yoke for interconnecting the two trailing arms to provide equal and opposite articulation thereof.

It is another object of the invention to provide an improved cambering vehicle which yoke mechanism is quickly and easily removable to provide for the folding of the vehicle for storage.

It is a further object of the invention to provide an improved cambering vehicle including stop means for limiting the arcuate travel of the two trailing arms.

An additional object of the invention is to provide an improved cambering vehicle including independent brakes for the rear wheels, with the two brakes being actuated by separate controls to provide at least some steering or turning guidance for the vehicle.

Still another object of the invention is to provide an improved cambering vehicle incorporating wheels, but which operating principle may be applied to skis, skates, and other sliding surface contact means.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises an operator powered cambering vehicle, in which the vehicle is propelled forwardly by means of the principle of conservation of angular momentum as the center of gravity of the operator and vehicle are repeatedly shifted to the inside of the turn as the vehicle travels a sinusoidal path. The present vehicle utilizes a novel means of linking the articulated portions of the structure together, in order that the trailing arms of the structure subtend equal but opposite arcs during operation.

Figure 1:
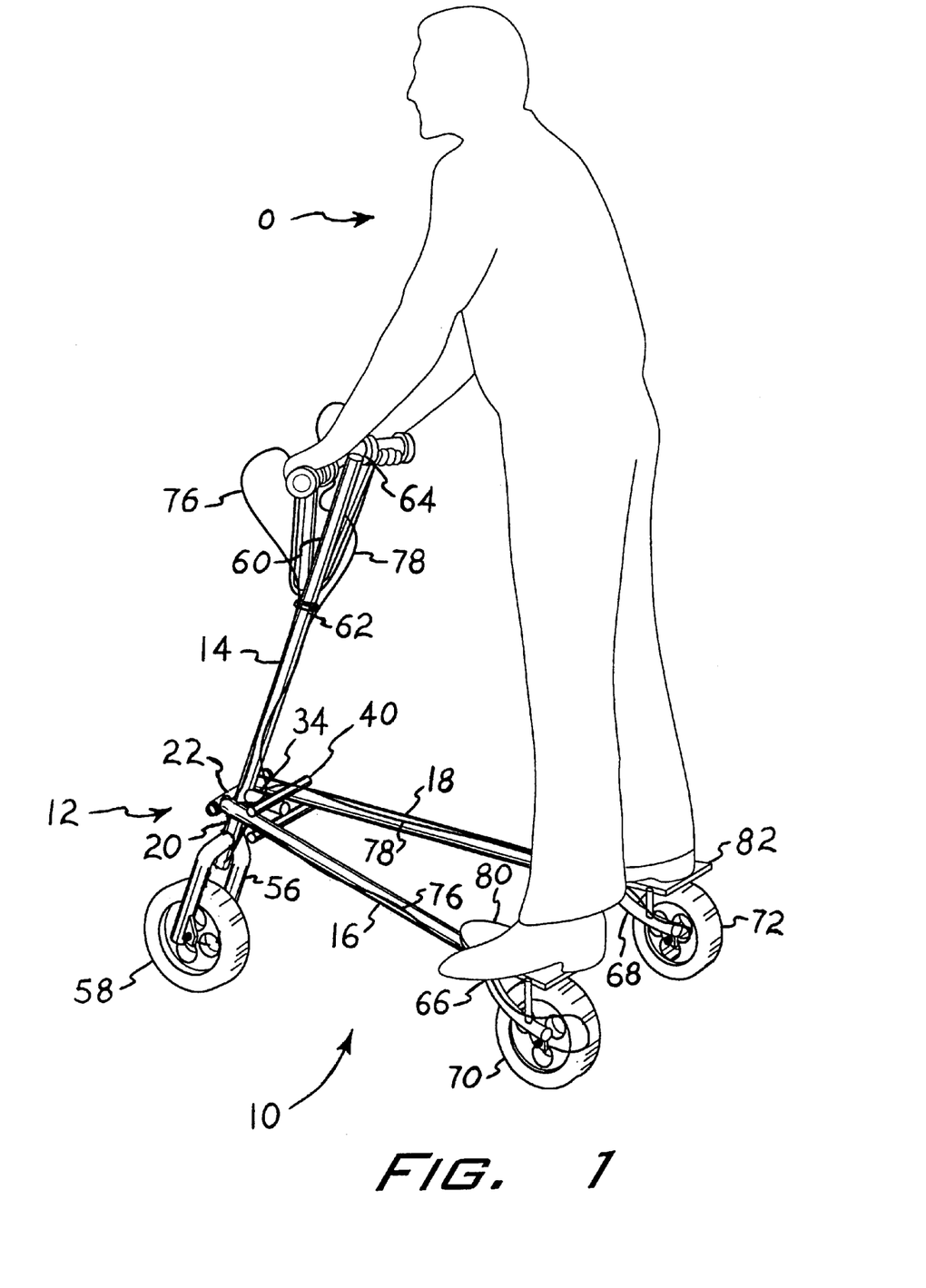
FIG. 1 is an environmental perspective view illustrating the present cambering vehicle in operation, and showing its general features.

FIG. 1 provides an environmental perspective view of the present cambering vehicle 10 in operation. The present vehicle 10 essentially comprises a tricycle frame 12 having a front column 14 and left and right trailing arms, respectively 16 and 18. The trailing arms 16 and 18 are pivotally attached to the front column 14, immediately above its lower end 20. Details of the attachment of the trailing arms 16 and 18 to the front column 14 are shown more clearly in FIGS. 2 through 4 of the drawings.

A trailing arm attachment fitting 22 is permanently secured across the front column 14 just above the lower end 20 thereof, with the attachment fitting 22 providing laterally opposed trailing arm attachment points, respectively 24 and 26, to the front column 14. The forward ends of the two trailing arms 16 and 18 have lateral bushings, respectively 28 and 30, thereacross, with a bolt 32 or other suitable fastener secured through each trailing arm bushing 28 and 30 to secure the trailing arms 16 and 18 pivotally to the fitting 22 of the lower end 20 of the front column 14.

A yoke attachment point 34 (shown more clearly in FIG. 4 of the drawings) extends rearwardly from the front column 14 just above the lower end 20 thereof, and is positioned circumferentially about the front column 14 essentially midway between the two laterally disposed trailing arm attachment points 24 and 26. The yoke attachment 34 has a relatively smaller diameter, rearwardly extending, internally threaded shaft 36 extending therefrom, to which the central bushing 38 of the trailing arm interconnecting yoke 40 is pivotally attached by its pivot passage and removably secured by a single yoke attachment fastener 42 (e.g., threaded bolt, etc.). This attachment means is similar to that used to secure the two trailing arms 16 and 18 to the trailing arm attachment fitting 22 of the lower portion of the front column 14.

The yoke 40 comprises an upper and a lower bar, respectively 44 and 46, with the two bars being parallel to one another and spaced apart from one another by the diameter of the central bushing 38 immovably installed (e.g., welded, etc.) therebetween, which serves as a central connecting link between the two yoke bars 44 and 46. The distance between the two yoke bars 44 and 46 is essentially equal to the diameters of the two trailing arms 16 and 18, with the two bars 44 and 46 capturing the two trailing arms 16 and 18 closely therebetween when the yoke 40 is secured to its attachment point 34 of the front column 14. The left ends 44*l* and 46*l* of the two bars 44 and 46 capture the left trailing arm 16 therebetween, with the right ends 44*r* and 46*r* capturing the right trailing arm 18 therebetween.

Figure 2:
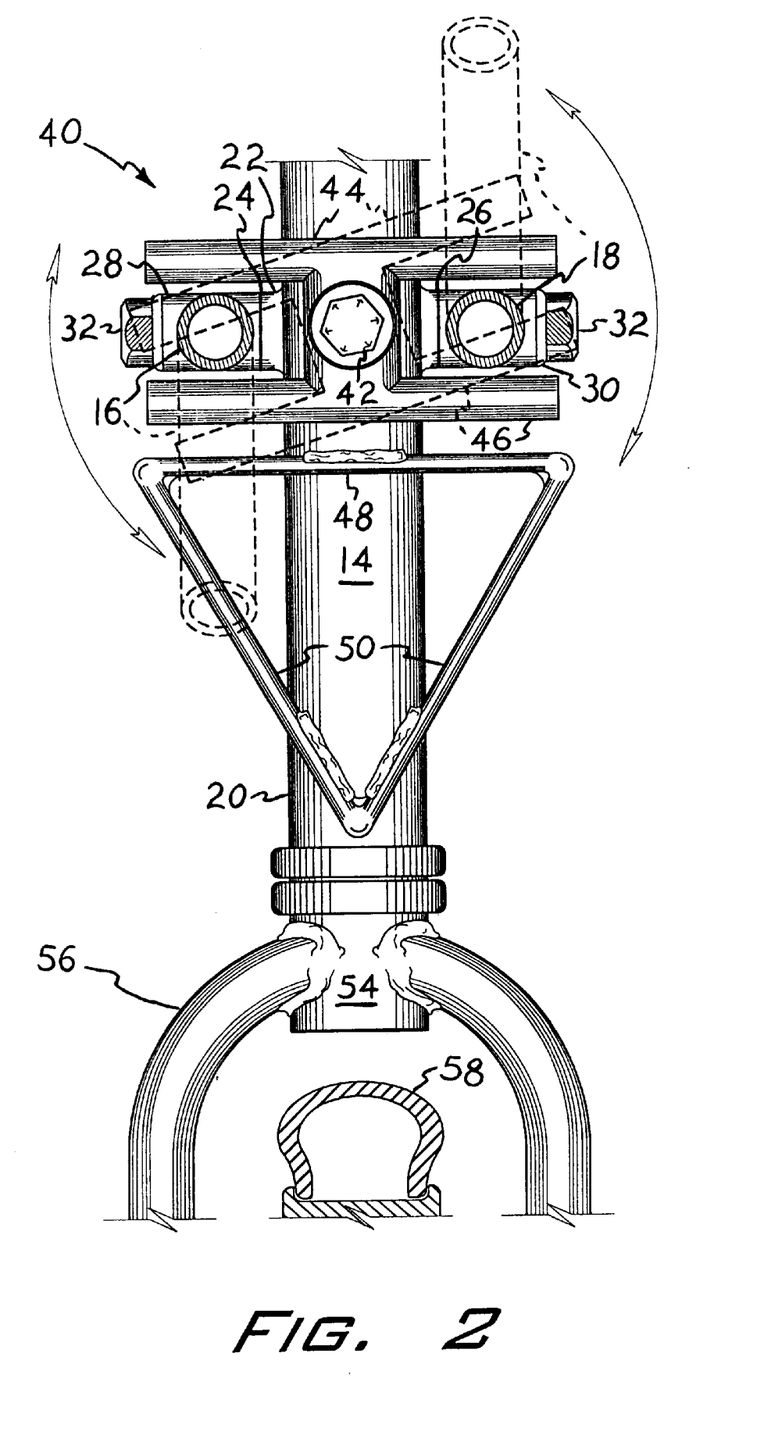
FIG. 2 is a detailed elevation view of the rear side of the front strut of the present cambering vehicle, showing details of the yoke mechanism interconnecting the two trailing arms and the operation thereof.
Figure 3:
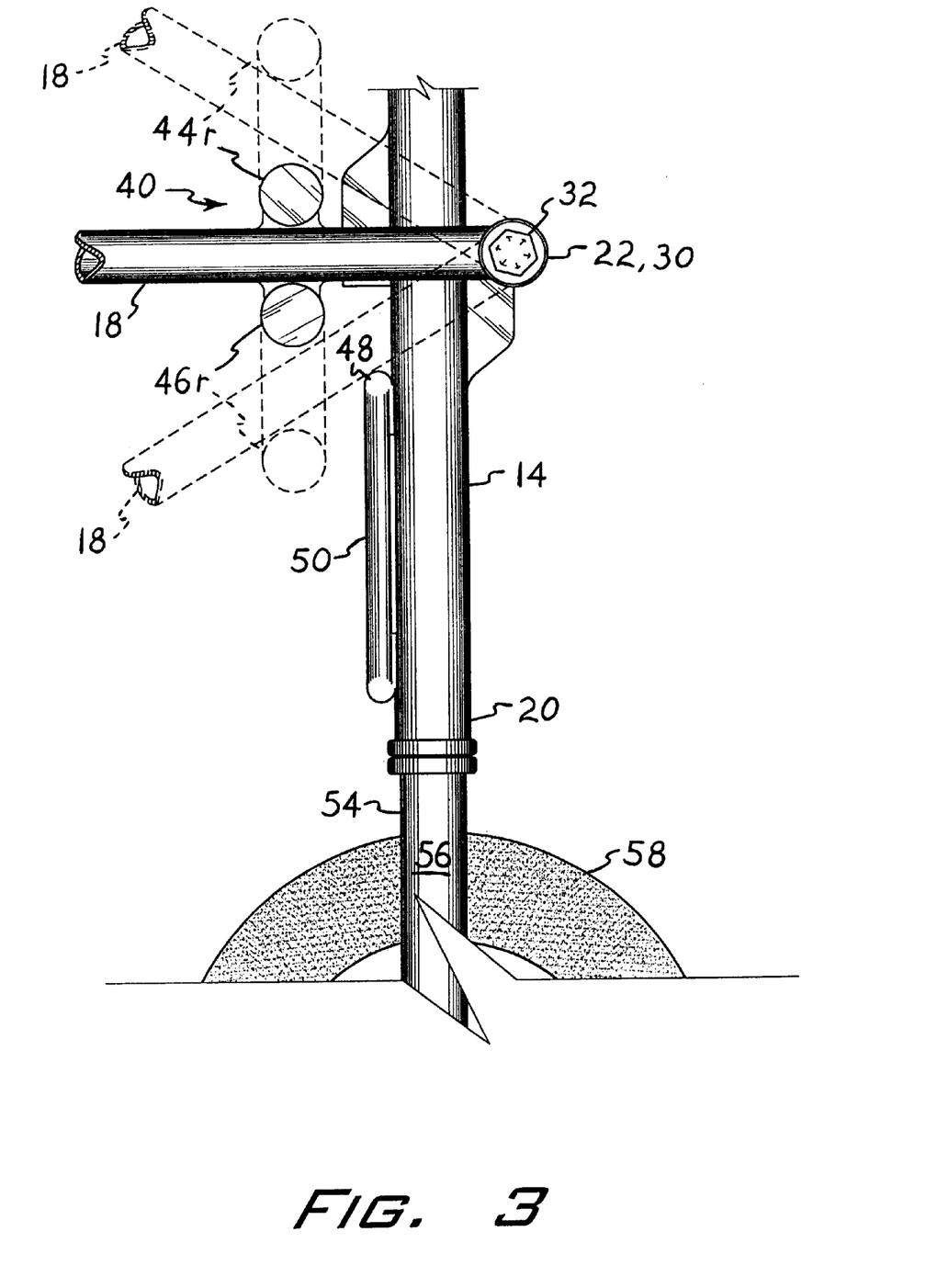
FIG. 3 is a detailed right side elevation view of the yoke mechanism of FIG. 2, showing further details of the operation thereof.

The operation of the yoke 40 structure is shown clearly in the rear and right side elevation views respectively of FIGS.

2 and 3. In each of those Figures, the central or neutral position of the yoke 40, and the two trailing arms 16 and 18 captured thereby, is shown in solid lines, with the extreme arcuate upward and/or downward positions of the trailing arms 16 and 18 and corresponding positions of the yoke arms 44 and 46 being shown in broken lines.

FIG. 2 provides an example in which the vehicle 10 is leaned or cambered to the right, with the right side trailing arm 18 displaced arcuately upwardly, as shown in broken lines in FIG. 2 and by the upper trailing arm position 18 of FIG. 3. When this occurs, the right ends 44r and 46r of the yoke arms 44 and 46 must follow the upward movement of the trailing arm 18 due to their direct contact therewith. As a result, the yoke 40 pivots arcuately about its central bushing link 38 and its attachment point 34 to the rear side of the front column 14, thus causing the opposite left ends 44l and 46l of the yoke arms 44 and 46 to deflect downwardly. When this occurs, the direct contact of the two left ends 44l and 46l of the yoke arms 44 and 46 about the left trailing arm 16, cause that arm 16 to be deflected arcuately downwardly.

The amount of arcuate deflection or travel of each trailing arm 16 and 18 is identical, due to their equidistant lateral offset from the yoke attachment point 34. However, due to the pivotal actuation of the yoke 40, the two arms 16 and 18 will always travel in arcuate directions opposite to one another.

The yoke interconnection of the two trailing arms 16 and 18, provides additional advantages as well. As noted above, the yoke 40 is removably secured to the front column 14 of the vehicle 10 by means of a single fastener 42 (bolt, etc.). Removal of this single fastener 42 permits the yoke 40 to be removed from its attachment point 34, thus removing the positive interconnect between the two trailing arms 16 and 18. The ease of removal of this single yoke attachment fastener 42, and removal of the yoke 40, permits the two trailing arms 16 and 18 to be rotated simultaneously to lie generally parallel, or at least somewhat adjacent, to the front column 14. Put somewhat differently, the front column 14 may be folded downwardly to lie adjacent the two trailing arms 16 and 18, to provide a compact configuration for storage as shown in broken lines in FIG. 5 of the drawings.

Figure 4:
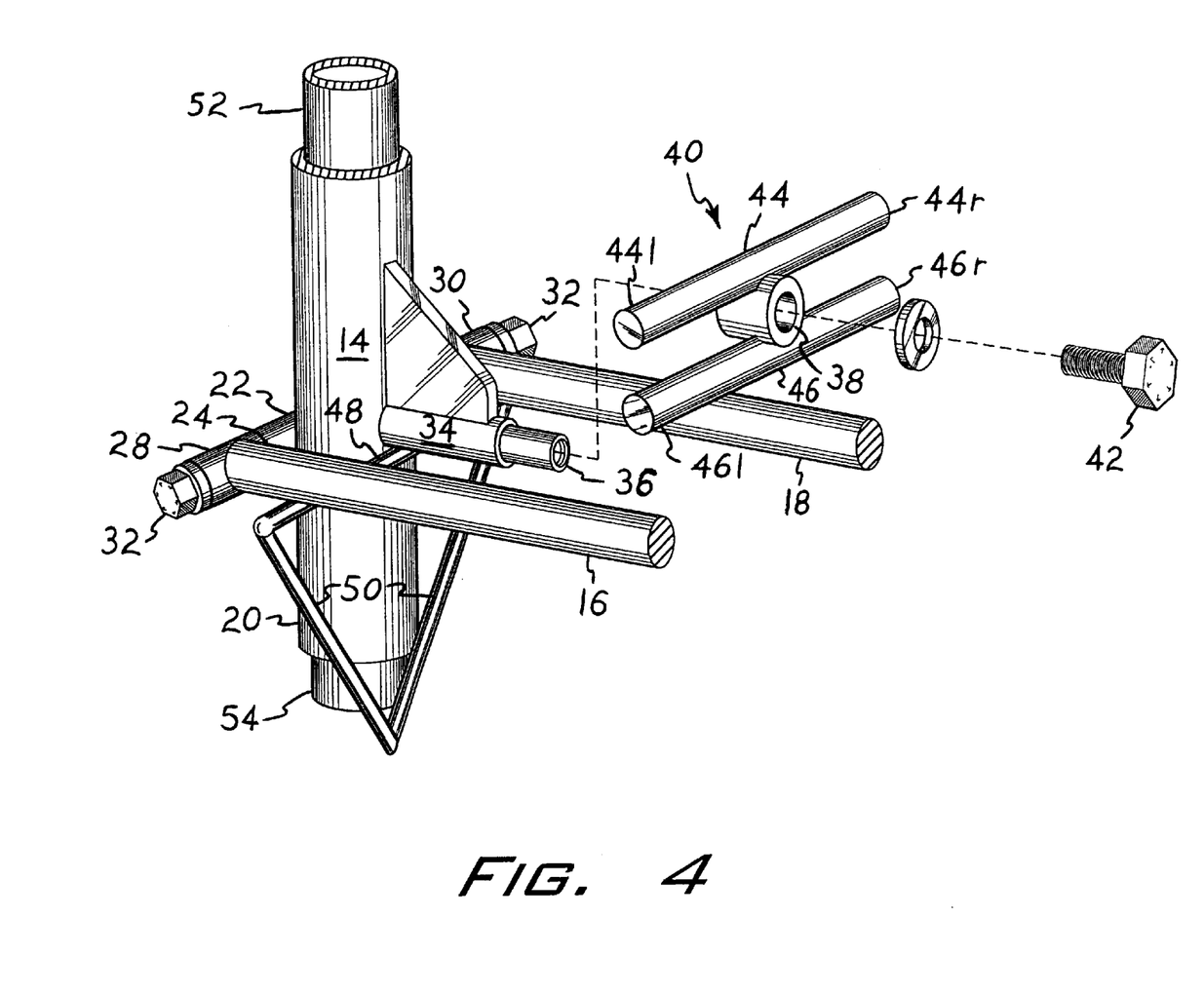
FIG. 4 is a detailed exploded perspective view of the yoke mechanism of FIGS. 2 and 3, illustrating the removal of the yoke from the front structure for folding the vehicle for storage.

It will be seen that no practicable limit is provided for the arcuate movement of the two trailing arms 16, 18 and corresponding arcuate movement of the yoke 40, by the above described structure. Accordingly, some form of stop means is preferably provided for precluding excessive arcuate movement of the two trailing arms 16 and 18, and resulting excessive camber of the vehicle 10 during operation. FIGS. 2 and 4 illustrate the trailing arm stop means of the present vehicle 10, comprising a lateral stop 48 which is immovably affixed to the back of the front column 14 immediately below the yoke attachment point 34. The stop 48 preferably includes lateral bracing 50, with the stop 48 and bracing 50 together comprising a generally triangular configuration, as shown.

When either the left or the right trailing arm 16 or 18 contacts the corresponding side of the stop bar 48, its arcuate movement is limited to that extent, with the interconnect of the opposite trailing arm by means of the yoke 40 serving to limit the arcuately opposite movement of that opposite arm. It will be seen that the stop means may take on other forms (e.g., a flat plate welded to the back of the column 14, etc.) as desired.

The cambering vehicle 10 of the present invention is illustrated throughout the drawings as a wheeled vehicle, although it will be seen that the vehicle 10 may be equipped with virtually any conventional type of either rolling or sliding surface contact means (e.g., in-line or other wheeled skates, ice skates, skis, etc.), as described in U.S. Pat. No. 4,087,106 to Winchell et al., discussed in the Description of the Related Art further above. The conservation of angular momentum principle of operation utilized by the present vehicle 10 is not limited to rolling means (e.g., wheels, roller skates, etc.), but may be applied to any low friction surface contact means allowing the vehicle 10 to travel over a surface with minimal frictional losses.

The wheeled embodiment of the present vehicle 10 exemplified in the drawings has a steering shaft 52 installed concentrically through the front column 14 (shown most clearly in FIG. 4 of the drawings), with the steering shaft 52 having a lower end 54 extending from the lower end 20 of the front column 14 with a wheel fork 56 (shown in FIGS. 1, 2, 3, and 5) extending therefrom for carrying a single steerable wheel 58 therein.

Figure 5:
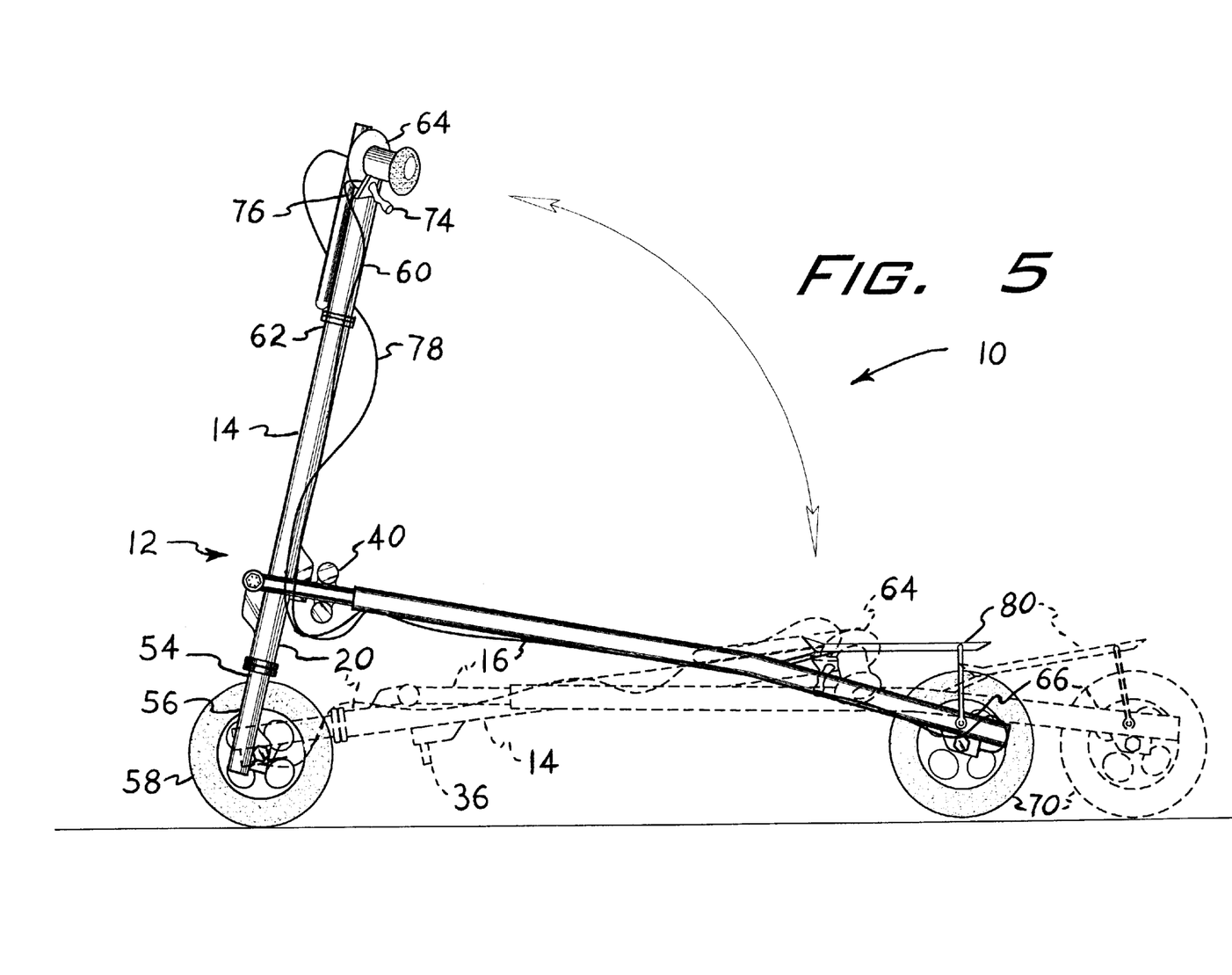
FIG. 5 is a left side elevation view of the present cambering vehicle, illustrating the folded position of the vehicle in broken lines.

The steering shaft 52 has an opposite upper end 60 which extends beyond the upper end 62 of the front column 14, with the upper end 60 of the steering shaft 52 including steering means (e.g., handlebars 64, as illustrated in FIGS. 1 and 5)) extending therefrom, for the operator to steer the present vehicle 10 as desired. Turning the handlebars 64 (or other steering means which may be provided) turns the steering shaft 52 within the front column 14 and turns the front wheel fork 56 with its front wheel 58 captured therein (or other surface contact means, as noted above) to steer and turn the vehicle 10 as desired.

Each trailing arm 16 and 18 has a rearward end, respectively 66 and 68, with surface contact means extending therefrom (e.g., wheels 70 and 72, as shown in FIGS. 1 and 5, but alternatively other means such as skates, skis, etc., as noted further above). As the present vehicle 10 is capable of moderate speeds on a smooth and level surface, on the order of a fast running pace, the two rear wheels 70 and 72 each include conventional brake means, with the left and right brakes being independent of one another. The left and right brakes of the rear wheels 70 and 72 are actuated by separate and independent actuating or control means, e.g., the conventional brake actuating lever 74 illustrated in FIG. 5 of the drawings, with it being understood that an essentially identical second lever, not shown, is provided at the right hand grip of the handlebars 64 for actuating the brake of the right rear wheel 72. The two brake actuating means operate the brakes by means of left and right brake cables, respectively 76 and 78.

The operator O of the present vehicle 10 operates the vehicle by standing atop the left and right foot rests, respectively 80 and 82, located at the rearward ends 66 and 68 of the two trailing arms 16 and 18 above their respective rear wheels 70 and 72, and gripping the steering means 64. The operator O then pushes off with one foot and simultaneously turns the vehicle 10 to the left or right as desired to establish a given angular momentum for the vehicle 10 and operator O. Leaning into the turn moves the center of gravity of the operator O and vehicle 10 to the inside of the turn. As the angular momentum must be conserved, the shifting of the center of gravity to a smaller radius results in a linear acceleration along the arcuate path of the turn, with the acceleration corresponding to the amount of the shift of the vehicle and operator center of gravity, less any frictional losses. The cambering of the vehicle 10 to lean to the inside of the turn is provided by the arcuate travel of the two trailing arms, with their arcuate motion being limited to equal and opposite motions by means of the yoke interconnection means of the present invention.

The above described process is continued in the opposite direction, with each shift of the operator O and vehicle 10 center of gravity to the inside of the turn (in whichever direction of turn) resulting in a linear acceleration along the arcuate path of travel of the vehicle 10. On a smooth and level surface, the resulting speed can be fairly high, with speed being controlled by the independently actuated brakes of the rear wheels, which can also assist in steering the vehicle 10, and other operator action.

In summary, the present cambering vehicle and its novel yoke mechanism for controlling opposite arcuate motion of the two trailing arms, provides a more efficient and cleaner means of providing for the control of such motion as required in such vehicles. The unitary, monolithic construction of the yoke mechanism of conventional weldments, results in a simple, inexpensive, and easily constructed unit, with no other parts or components being required to affect the required action of the trailing arms. Another advantage to the present mechanism is its attachment and ease of removal by means of a single pivot bolt, which enables the vehicle to be folded to an essentially flat configuration for storage. The yoke may be reinstalled upon its attachment point to the rear of the forward column to preclude its loss during storage, after being removed from the trailing arms.

The present vehicle may be constructed in the same manner as the yoke mechanism described above, i.e., welded up of conventional metal tubular stock, as shown in the drawing Figures. Other construction means (e.g., stampings, carbon fiber and/or other composites, etc.) may be used for large scale production, if so desired. The present cambering vehicle and its yoke mechanism provide a much needed improvement in efficiency of construction for such devices, with its operation providing excellent exercise, as well as transportation, for the operator.

It is to be understood that the present invention is not limited to the sole embodiment described above, but encompasses any and all embodiments within the scope of the following claims.

I claim:

1. A cambering vehicle, comprising:
    a frame comprising a front column and a left and a right trailing arm;
    said front column having an upper end and a lower end opposite said upper end;
    each said trailing arm having a forward end and a rearward end opposite said forward end;
    a left and a right trailing arm attachment point disposed opposite one another upon said front column, and immediately above said lower end thereof;
    said forward end of said left and said right trailing arm being pivotally attached respectively to said left and said right trailing arm attachment point of said front column;
    a yoke attachment point disposed circumferentially rearwardly substantially midway between said left and said right trailing arm attachment point of said front column;
    a yoke pivotally secured to said yoke attachment point of said front column;
    said yoke directly contacting and pivotally linking said left and said right trailing arm together such that said left and said right trailing arm each subtend arcs equal to one another and in directions opposite to one another when arcuately pivoted respectively about said left and said right trailing arm attachment point of said front column;
    surface contact means extending from said rearward end of each said trailing arm;
    a steering shaft having an upper end and a lower end opposite said upper end, and concentrically disposed within said front column; and
    a single surface contact means extending from said lower end and steering means extending from said upper end of said steering shaft.

2. The cambering vehicle according to claim 1, wherein said yoke comprises an upper and a lower bar connected by a central link, with each said bar being parallel to one another and capturing said left and said right trailing arm therebetween adjacent to each said forward end thereof, with said central link including a pivot passage centrally disposed therethrough for pivotally securing said yoke to said yoke attachment point of said front column.

3. The cambering vehicle according to claim 1, including a single removable fastener for removably securing said yoke to said yoke attachment point of said front column and folding said front column adjacent said left and said right trailing arm when said yoke is removed.

4. The cambering vehicle according to claim 1, wherein at least said surface contact means of each said trailing arm comprises a wheel, with each said wheel including a brake and each said brake being controlled independently from one another by a separate brake control disposed upon said steering means and communicating with each said brake.

5. The cambering vehicle according to claim 1, including trailing arm stop means disposed upon said front column, for limiting arcuate movement of each said trailing arm.

6. The cambering vehicle according to claim 1, wherein said steering means comprises handlebars.

7. The cambering vehicle according to claim 1, wherein said surface contact means of each said trailing arm and said steering shaft is selected from the group consisting of wheels, wheeled skates, ice skates, and skis.

8. A cambering vehicle, comprising:
    a frame comprising a front column and a left and a right trailing arm;
    said front column having an upper end and a lower end opposite said upper end;
    each said trailing arm having a forward end and a rearward end opposite said forward end;
    a left and a right trailing arm attachment point disposed opposite one another upon said front column, and immediately above said lower end thereof;
    said forward end of said left and said right trailing arm being pivotally attached respectively to said left and said right trailing arm attachment point of said front column;
    means for interconnecting said left and said right trailing arm together such that said left and said right trailing arm each subtend arcs equal to one another and in directions opposite to one another when arcuately pivoted respectively about said left and said right trailing arm attachment point of said front column;
    a single wheel extending from said rearward end of each said trailing arm;
    a steering shaft having an upper end and a lower end opposite said upper end, and concentrically disposed within said front column;
    a single wheel extending from said lower end and steering means extending from said upper end of said steering shaft;
    brake means disposed with said wheel of each said trailing arm; and separate and independent brake control means for each said brake means disposed upon said steering means and communicating with said brake means for separate and independent control thereof.

9. The cambering vehicle according to claim 8, wherein said means for interconnecting said left and said right trailing arm together comprises:
- a yoke attachment point disposed circumferentially rearwardly substantially midway between said left and said right trailing arm attachment point of said front column; and
- a yoke pivotally secured to said yoke attachment point of said front column, and directly communicating with and pivotally linking said left and said right trailing arm together.

10. The cambering vehicle according to claim 9, wherein said yoke comprises an upper and a lower bar connected by a central link;
- each said bar being parallel to one another and capturing said left and said right trailing arm therebetween adjacent to each said forward end thereof; and
- said central link including a pivot passage centrally disposed therethrough for pivotally securing said yoke to said yoke attachment point of said front column.

11. The cambering vehicle according to claim 9, including a single removable fastener for removably securing said yoke to said yoke attachment point of said front column and folding said front column adjacent said left and said right trailing arm when said yoke is removed.

12. The cambering vehicle according to claim 8, including trailing arm stop means disposed upon said front column, for limiting arcuate movement of each said trailing arm.

13. The cambering vehicle according to claim 8, wherein said steering means comprises handlebars.

14. A cambering vehicle, comprising:
- a frame comprising a front column and a left and a right trailing arm;
- said front column having an upper end and a lower end opposite said upper end;
- each said trailing arm having a forward end and a rearward end opposite said forward end;
- a left and a right trailing arm attachment point disposed opposite one another upon said front column, and immediately above said lower end thereof;
- said forward end of said left and said right trailing arm being pivotally attached respectively to said left and said right trailing arm attachment point of said front column;
- a yoke attachment point disposed circumferentially rearwardly substantially midway between said left and said right trailing arm attachment point of said front column;
- a yoke pivotally secured to said yoke attachment point of said front column;
- said yoke directly contacting and pivotally linking said left and said right trailing arm together such that said left and said right trailing arm each subtend arcs equal to one another and in directions opposite to one another when arcuately pivoted respectively about said left and said right trailing arm attachment point of said front column;
- a single removable fastener for removably securing said yoke to said yoke attachment point of said front column and folding said front column adjacent said left and said right trailing arm when said yoke is removed;
- surface contact means extending from said rearward end of each said trailing arm;
- a steering shaft having an upper end and a lower end opposite said upper end, and concentrically disposed within said front column; and
- a single surface contact means extending from said lower end and steering means extending from said upper end of said steering shaft.

15. The cambering vehicle according to claim 14, wherein said yoke comprises an upper and a lower bar connected by a central link, with each said bar being parallel to one another and capturing said left and said right trailing arm therebetween adjacent to each said forward end thereof, with said central link including a pivot passage centrally disposed therethrough for pivotally securing said yoke to said yoke attachment point of said front column.

16. The cambering vehicle according to claim 14, wherein at least said surface contact means of each said trailing arm comprises a wheel, with each said wheel including a brake and each said brake being controlled independently from one another by a separate brake control disposed upon said steering means and communicating with each said brake.

17. The cambering vehicle according to claim 14, including trailing arm stop means disposed upon said front column, for limiting arcuate movement of each said trailing arm.

18. The cambering vehicle according to claim 14, wherein said steering means comprises handlebars.

19. The cambering vehicle according to claim 14, wherein said surface contact means of each said trailing arm and said steering shaft are selected from the group consisting of wheels, wheeled skates, ice skates, and skis.

\* \* \* \* \*